United States Patent
Brown et al.

(10) Patent No.: US 10,788,886 B2
(45) Date of Patent: *Sep. 29, 2020

(54) CONTROLLING TRANSITIONS OF DEVICES BETWEEN NORMAL STATE AND QUIESCENT STATE

(71) Applicant: ARM LIMITED, Cambridge, Cambridgeshire (GB)

(72) Inventors: Dominic William Brown, Ely (GB); Christopher Vincent Severino, Haverhill (GB); Ashley John Crawford, Ashdon (GB)

(73) Assignee: ARM limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/567,707

(22) PCT Filed: Mar. 16, 2016

(86) PCT No.: PCT/GB2016/050711
§ 371 (c)(1),
(2) Date: Oct. 19, 2017

(87) PCT Pub. No.: WO2016/174386
PCT Pub. Date: Nov. 3, 2016

(65) Prior Publication Data
US 2018/0120926 A1    May 3, 2018

(30) Foreign Application Priority Data
Apr. 28, 2015   (GB) .................................. 1507185.5

(51) Int. Cl.
*G06F 1/26*       (2006.01)
*G06F 1/32*       (2019.01)
(Continued)

(52) U.S. Cl.
CPC .......... *G06F 1/3296* (2013.01); *G06F 1/3203* (2013.01); *G06F 1/3215* (2013.01);
(Continued)

(58) Field of Classification Search
CPC ..................................... G06F 1/26; G06F 1/32
See application file for complete search history.

(56) References Cited

U.S. PATENT DOCUMENTS 5,694,617 A * 12/1997 Webb .................. G06F 11/1405
340/3.4
6,092,209 A   7/2000 Holzhammer et al.
(Continued)

FOREIGN PATENT DOCUMENTS

WO    WO 02/27451    4/2002

OTHER PUBLICATIONS

International Search Report and Written Opinion of the ISA for PCT/GB2016/050711, dated Jun. 8, 2016, 13 pages.
(Continued)

*Primary Examiner* — Phil K Nguyen
(74) *Attorney, Agent, or Firm* — Nixon & Vanderhye, P.C.

(57) ABSTRACT

A data processing apparatus has a number of devices having a normal state and a quiescent state in which the device is ready for being placed in a power saving state. Each device provides at least one preference indication indicative of a preference to operate in the normal state or the quiescent state. A controller controls a common state transition process for transitioning each of the devices 4 between the normal state and the quiescent state based on the preference indication received from each device.

18 Claims, 11 Drawing Sheets

(51) Int. Cl.
*G06F 1/3296* (2019.01)
*G06F 1/3287* (2019.01)
*G06F 1/3203* (2019.01)
*G06F 1/3237* (2019.01)
*G06F 1/3215* (2019.01)

(52) U.S. Cl.
CPC .......... *G06F 1/3237* (2013.01); *G06F 1/3287* (2013.01); *Y02D 10/128* (2018.01); *Y02D 10/171* (2018.01); *Y02D 50/20* (2018.01)

(56) References Cited

U.S. PATENT DOCUMENTS

| | | | | |
|---|---|---|---|---|
| 6,711,691 | B1* | 3/2004 | Howard | G06F 1/3203 713/300 |
| 8,086,213 | B1* | 12/2011 | Wong | H04W 52/0206 455/343.1 |
| 8,310,488 | B2* | 11/2012 | Rose | G06F 1/3218 345/502 |
| 10,025,608 | B2* | 7/2018 | Fee | G06F 9/45554 |
| 10,185,378 | B2* | 1/2019 | Tsao | G06F 1/266 |
| 2001/0010066 | A1* | 7/2001 | Chin | G06F 13/1605 711/108 |
| 2004/0093460 | A1* | 5/2004 | Verdun | G06F 1/3203 711/105 |
| 2004/0215983 | A1* | 10/2004 | Kwahk | G06F 1/3215 713/300 |
| 2004/0228359 | A1* | 11/2004 | Korb | H04L 12/2854 370/406 |
| 2005/0273633 | A1 | 12/2005 | Wilcox et al. | |
| 2008/0005445 | A1* | 1/2008 | Diefenbaugh | G06F 13/385 710/313 |
| 2009/0094438 | A1* | 4/2009 | Chakraborty | G06F 1/3203 712/30 |
| 2009/0204837 | A1 | 8/2009 | Raval | |
| 2011/0078478 | A1 | 3/2011 | Branover | |
| 2011/0321048 | A1* | 12/2011 | Gaertner | G06F 9/52 718/102 |
| 2012/0240111 | A1* | 9/2012 | Kobayashi | G06F 9/45558 718/1 |
| 2012/0284442 | A1 | 11/2012 | Card | |
| 2013/0042026 | A1* | 2/2013 | Shinomiya | G08C 17/00 710/5 |
| 2013/0073878 | A1 | 3/2013 | Jayasimha et al. | |
| 2013/0083611 | A1* | 4/2013 | Ware | G11C 11/4072 365/191 |
| 2013/0086398 | A1 | 4/2013 | Khor et al. | |
| 2014/0181556 | A1* | 6/2014 | Eckert | G06F 1/324 713/323 |
| 2017/0017293 | A1 | 1/2017 | Muccini | |

OTHER PUBLICATIONS

Combined Search and Examination Report for GB1507185.5, dated Oct. 21, 2015, 5 pages.
Examination Report dated Aug. 10, 2018 in GB Application No. 1507185.5, 4 pages.
Office Action in related U.S. Appl. No. 15/567,696 dated Aug. 19, 2019.

* cited by examiner

| QREQn | QACCEPTn | QDENY | Interface state | Description |
|---|---|---|---|---|
| 1 | 1 | 0 | Q_RUN | Device is operational. |
| 0 | 1 | 0 | Q_REQUEST | Device is operational, but requested to become quiescent when idle. |
| 0 | 0 | 0 | Q_STOPPED | Device has entered the quiescent state. This is the only state where the controller does not guarantee the availability of any resource managed by the interface. |
| 1 | 0 | 0 | Q_EXIT | Supply of clock or power is guaranteed. When the device acknowledges, by deasserting QACCEPTn HIGH, the state moves to Q_RUN. |
| 0 | 1 | 1 | Q_DENIED | Device denies request to become quiescent and remains operational. Controller must deassert QREQn. |
| 1 | 1 | 1 | Q_CONTINUE | Controller deasserts QREQn HIGH after Q_DENIED. Device is operational. |
| x | 0 | 1 | Unused (illegal) | - |

FIG. 7

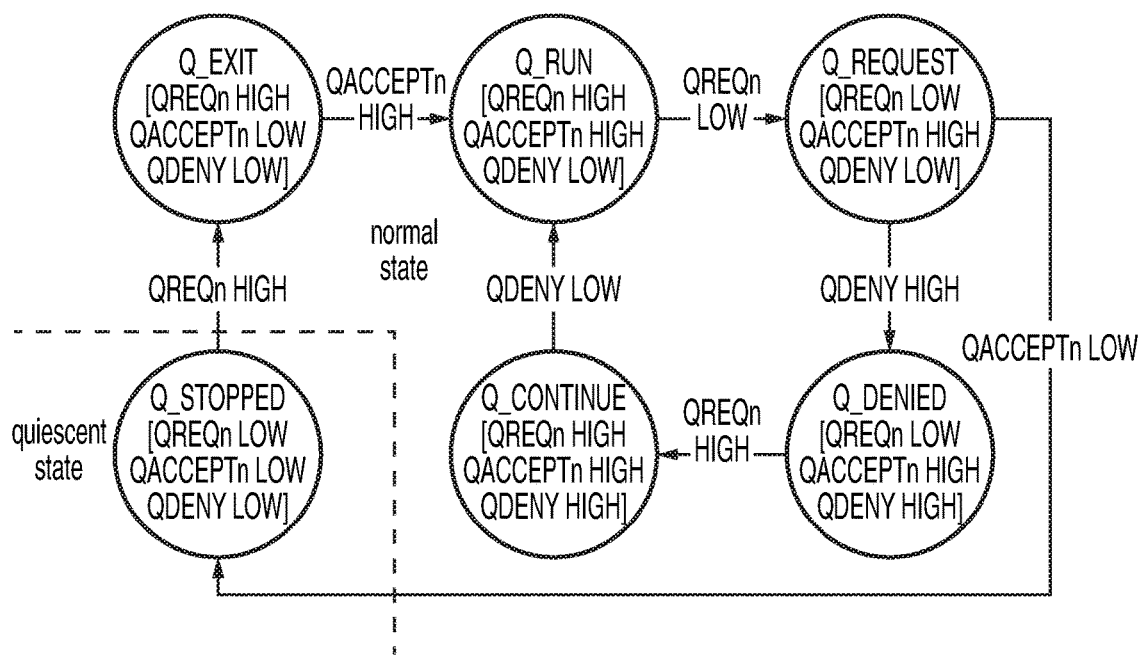

FIG. 8

CONTROLLING TRANSITIONS OF DEVICES BETWEEN NORMAL STATE AND QUIESCENT STATE

This application is the U.S. national phase of International Application No. PCT/GB2016/050711 filed 16 Mar. 2016, which designated the U.S. and claims priority to GB Patent Application No. 1507185.5 filed 28 Apr. 2015, the entire contents of each of which are hereby incorporated by reference.

The present technique relates to the field of data processing. More particularly, it relates to controlling whether devices operate in a normal state or a quiescent state.

A data processing apparatus may support some devices being switched to a power saving state to reduce power consumption.

At least some examples provide a data processing apparatus comprising a plurality of devices; and a controller configured to control transitions of the plurality of devices between a normal state and a quiescent state in which the device is ready for being placed in a power saving state; wherein each device is configured to provide at least one preference indication indicative of a preference to operate in the normal state or the quiescent state; and the controller is configured to control a common state transition process for transitioning each of said plurality of devices between the normal state and the quiescent state, in dependence on the at least one preference indication received from each of the plurality of devices.

At least some examples provide a controller comprising control circuitry configured to control transitions of a plurality of devices between a normal state and a quiescent state in which the device is ready for being placed in a power saving state; and an interface configured to receive, from each of the plurality of devices, at least one preference indication indicative of a preference to operate in the normal state or the quiescent state; wherein the control circuitry is configured to control a common state transition process for transitioning each of said plurality of devices between the normal state and the quiescent state, in dependence on the at least one preference indication received from each of the plurality of devices.

At least some examples provide a data processing apparatus comprising a plurality of device means for operating in a normal state or a quiescent state in which the device means is ready for being placed in a power saving state; and control means for controlling transitions of the plurality of device means between the normal state and the quiescent state; wherein each device means is configured to provide at least one preference indication to the control means indicative of a preference to operate in the normal state or the quiescent state; and the control means is configured to control a common state transition process for transitioning each of said plurality of device means between the normal state and the quiescent state, in dependence on the at least one preference indication received from each of the plurality of device means.

At least some examples provide a controller comprising means for controlling transitions of a plurality of devices between a normal state and a quiescent state in which the device is ready for being placed in a power saving state; and means for receiving, from each of the plurality of devices, at least one preference indication indicative of a preference to operate in the normal state or the quiescent state; wherein the means for controlling is configured to control a common state transition process for transitioning each of said plurality of devices between the normal state and the quiescent state, in dependence on the at least one preference indication received from each of the plurality of devices.

At least some examples provide a method for controlling a plurality of devices having a normal state and a quiescent state in which the device is ready for being placed in a power saving state; the method comprising: receiving from each of the plurality of devices at least one preference indication indicative of a preference to operate in the normal state or the quiescent state; and controlling a common state transition process for transitioning each of said plurality of devices between the normal state and the quiescent state, in dependence on the at least one preference indication received from each of the plurality of devices.

Further aspects, features and advantages of the present technique will be apparent from the following description of examples, which is to be read in conjunction with the accompanying drawings, in which:

FIG. 1 schematically illustrates an example of a data processing apparatus comprising a number of devices and at least one controller for controlling transitions of the devices between a normal state and a quiescent state;

FIG. 7 is a table summarising states of a quiescence control channel between a device and the controller;

FIG. 8 is an example state diagram showing transitions between the states shown in FIG. 7;

Figure 1:
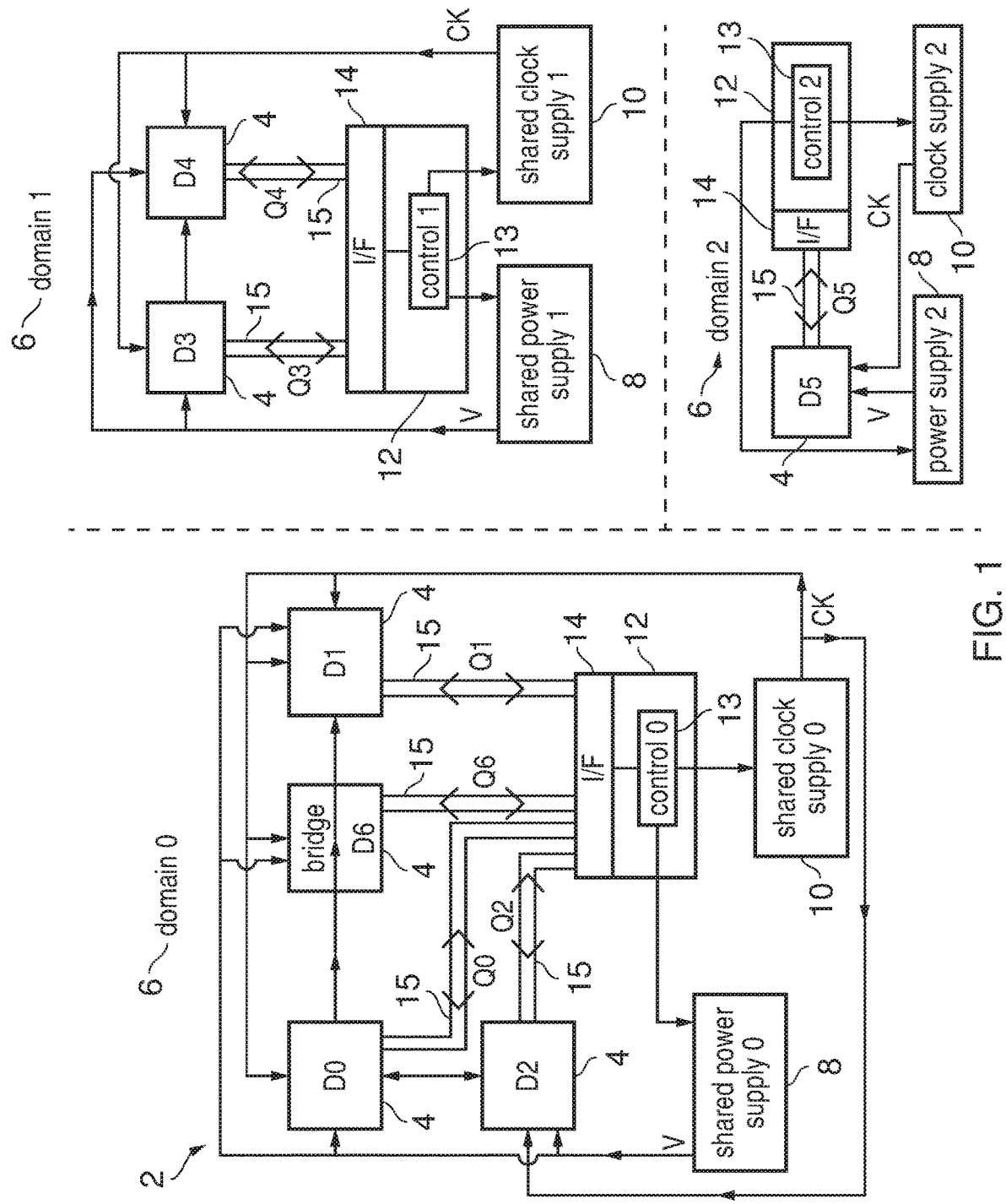

Some examples of the present technique will now be described.

A data processing apparatus may have a number of devices which may each have a normal state and a quiescent state. The quiescent state may be a state in which the device is ready for being placed in a power saving state such as a state in which a power supply or clock supply to the device is removed. In some systems, each device may issue at least one preference indication to a controller to provide some indication of a preference to operate in the normal state or the quiescent state. By considering each device's preference indication, this can allow more frequent use of power saving states when a certain group of components idle, even during relatively short periods, compared to approaches which consider only whether the apparatus as a whole is idle which would tend to lead to a more conservative adoption of the quiescent state.

However, typically in systems where a controller receives individual preference indications from a number of devices, the controller would control transitions between the normal state and quiescent state individually for each device, entirely independently of other devices. For example the controller may issue separate requests to enter or exit the normal state or quiescent state for each device. However, the inventors realised that for some groups of devices there may be little power advantage to transitioning an individual device into the quiescent state independently from other devices in the group. For example, the group of devices may share a common clock or power supply, so even if one of these devices enters the quiescent state and is ready for a power saving state, if other devices are still in the normal state then the power or clock supply is still supplied to the other devices, and so there is little power saving benefit. Also, a device that has already entered the quiescent state may not be able to respond quickly to requests for processing operations or tasks, as it may first need to return to the normal state. Therefore, there may also be a performance overhead with transitioning individual devices into the quiescent state and back to the normal state, which may not be justified when there is little corresponding power saving benefit.

The data processing apparatus may be provided with a controller for controlling a common state transition process for transitioning each of a plurality of devices between the normal state and the quiescent state in dependence on the at least one preference indication received from each of the plurality of devices. Hence, by controlling entry to the quiescent state and/or exit from the quiescent state in a common process for a number of devices, in dependence on each device's preference indication, performance can be improved because there may be less latency in waking up individual devices and less thrashing of devices between the normal state and quiescent states when one component is idle but another device is still active.

Hence, whether a particular device is in the normal state or the quiescent state may depend not only on the preference indication received from that device but also on at least one preference indication received from each of the other devices within the plurality of devices for which the state transition is managed in common by the controller.

In one example, the controller may trigger a quiescent state entry process for transitioning each of the plurality of devices from the normal state to the quiescent state when the at least one preference indication from each of the plurality of devices indicates a preference to operate in a quiescent state. Hence, if only some of the devices within the domain controlled by the controller indicate a preference for the quiescent state but there are other devices which still prefer to operate in the normal state, then the quiescent state entry process may not be triggered and the devices may all remain in the normal state so that each device can respond more quickly when it again needs to perform operations. When all of the devices indicate a preference for the quiescent state then the controller can begin moving the devices to the quiescent state.

If during the quiescent state entry process, one or more of the devices changes its preference indication to indicate a preference for the normal state (e.g. the device may have received a request to carry out a task), then the quiescent state entry process can be suspended, since again there may not be a power saving advantage to leaving just some of the devices in the quiescent state. Upon suspension of the quiescent state entry process, the controller can return to the normal state any device which has already transitioned to the quiescent state, so that if that device has to carry out a task later then there is a reduced latency in responding.

Once the devices are all in the quiescent state, if any one or more of the devices indicate a preference to operate in a normal state, then a quiescent state exit process can be triggered and this can transition each of the devices back to the normal state.

Hence, in summary the transitions between the normal and quiescent states may be controlled in common for a number of devices so that, other than during the quiescent state entry or exit process when the device states may differ for a time, each of the devices may generally be in the same one of the normal state and quiescent state.

The at least one preference indication may take various forms. In some examples the preference indication could merely be a hint from the device that the device (or another device associated with the device) may or may not have operations to perform. For example the preference indication could include an active signal indicating whether there is activity to perform (e.g. instructions to execute, incoming requests to process, etc.). If there is activity to perform, this may indicate a preference to operate in the normal state, and if there is no activity to perform, this may indicate a preference to operate in the quiescent state. In some systems the controller may be prevented from triggering or completing a quiescent state entry if any of the devices issues an active signal indicating that there is activity to perform. In other systems the controller may sometimes be able to override the active indication from a particular device and insist on quiescent state entry despite an indication of activity to perform. However, often the controller may follow the hint provided by the active signal.

In other examples the preference indication may be an explicit denial of a request to enter the quiescent state. Hence, if a controller requests that a device transitions to the quiescent state, the device may issue at least one deny signal which indicates that the request is denied. In some cases the deny signal may be an acceptance signal which when not asserted indicates denial of the request. Other systems may provide two separate acceptance and denial signals to signal acceptance and denial of the request respectively. Regardless of the particular form of these signals, the device may provide some kind of indication of whether a request to enter the quiescent state has been accepted or denied, and the controller may use this to determine the device's preference for operating in the normal state or quiescent state.

In summary, in general the preference indication may be any signal or other piece of information set by the device to provide at least a partial hint as to whether it is preferable for the device to operate in a normal state or the quiescent state. In some cases the preference indication may be a hardware signal transmitted between the device and the controller. In other examples, the device may set a value in a control register which represents the preference indication, which can be read by the controller to determine the device's preference.

The apparatus may include different devices with different forms of the preference indication. For example, a first type of device may provide the active signal indicating whether the device has operations to perform, while a second type of device may provide both an active signal and a deny signal which indicates whether a request to enter the quiescent state is denied. The controller may be compatible with any of these types of devices. For example on transitioning to the quiescent state, the controller may trigger the quiescent state entry process when the at least one active signal from each of the devices (including the first type and second type of devices) indicates that none of the devices has activities to perform. The controller may suspend the quiescent state entry process if any of the devices of the first type issues the active signal to indicate that that device has activity to perform, or if any of the devices of the second type issues the deny signal to indicate that the request to enter the quiescent state is denied. Optionally, the controller may also suspend the quiescent state entry process if any of the devices of the second type issues the active signal to indicate that the device has activity to perform. On exiting the quiescent state, the quiescent state exit process may be triggered by the controller when any one or more of the devices (of the first type or second type) issues the active signal indicating that the device has operations to perform. In this way, the controller can control the common state transition process for each device of both the first and second types.

When all of the devices are in the quiescent state, the controller may switch the devices to the power saving state. For example, the controller may isolate the devices from a shared power supply or shared clock supply, e.g. using power gating or clock gating techniques.

The quiescent state may for example be any state in which the device can safely switch to the power saving state. The exact details of the quiescent state may depend on the type of device. Some devices may need to complete at least some outstanding processing operations before switching to the quiescent state. Other devices may need to carry out some preparatory action for switching to the quiescent state, such as writing back dirty data to memory to maintain data coherency, or signaling to another device that the device may be powered down. Hence, different devices may have different protocols for switching between the normal state and the quiescent state. By controlling entry to the quiescent state and exit from the quiescent state in common for a number of devices, the overhead associated with these preparatory actions for example can be avoided unless there is a power saving benefit to be achieved when all the devices in the group can be quiescent.

The normal state may include any state of the device other than the quiescent state (in which the device is ready for the power saving state) or the power saving state (in which power consumption of the device is reduced). In some cases the normal state may itself include a number of different states of the device.

Not all of the devices of the apparatus need to have their transitions to the quiescent state controlled in common by the controller. In some cases, there may be at least one further device for which transitions between the normal state and the quiescent state are controlled independently from the plurality of devices. For example, in some cases the group of devices for which transitions are controlled in common may be a number of devices which share a common power or clock supply while other devices for which the power or clock supply can be controlled independently may transition separately to the quiescent state. In some cases there may be a number of control domains within the data processing apparatus and the devices within the same domain may have their transitions to and from the quiescent state managed in common, while devices in another domain have a separate common process for transitioning states.

FIG. 1 schematically illustrates an example of a data processing apparatus 2 which includes a number of devices 4 (seven devices D0 to D6 are shown in this example). The devices may for example include a processor, central processing unit (CPU), graphics processing unit (GPU), co-processor or any other unit for performing processing activity in response to instructions, a peripheral controller, input/output interface, direct memory access (DMA) controller, or other control unit within the system, a storage device such as a cache or memory, a device for communicating between two or more other devices, such as an interconnect or bridge unit, or any other component of the data processing apparatus. In some cases, some of the devices 4 may correspond to different parts of a common unit within the apparatus.

As shown in FIG. 1, the apparatus 2 may comprise a number of domains 6 with each domain including one or more devices 4. The devices within the same domain 6 share a common power supply 8 and a common clock supply 10. While FIG. 1 shows the power supply 8 and clock supply 10 for each domain as a separate block, it will be appreciated that in practice the power supply or clock supply for different domains may be derived from a common source of power or a common source of a clock signal, but with power gates or clock gates allowing the power or clock supply to be switched on or off independently for each domain. When the power and/or clock supply to a device is switched off or gated, the device is in a power saving state.

Each domain 6 also includes a controller 12 for controlling whether devices 4 in the corresponding domain are in a normal state or a quiescent state. In the normal state, the device is not ready for entering the power saving state. In the quiescent state, the device is in a state ready for the power saving state, so that the clock or power supply can safely be removed. Each controller 12 includes control circuitry 13 for controlling state transitions of the corresponding devices and an interface 14 for communicating with the devices. In some cases the control circuitry 13 may also act as a power controller for controlling whether the shared power supply 8 or clock supply 10 for that domain is active or powered down. For each domain, the controller 12 manages a common state transition process for transitioning the devices 4 in that domain between the normal state and the quiescent state. This will be discussed in more detail below. While FIG. 1 shows each domain 6 having a separate controller 12, in other examples a single control unit could control more than one domain.

Each device has a corresponding communication channel 15 (which may be referred to as a quiescence control channel or "Q channel") for communicating with the corresponding controller 12. Each device 4 may transmit at least one preference indication over its Q channel 15, to signal a preference to operate in the normal state or the quiescent state. The controller 12 may transmit a signal over the Q channel 15 requesting that a device enters or exits the quiescent state, and the device 4 may respond with a response signal indicating whether the request has been accepted or denied. Hence, the controller 12 uses the signals on each Q channel to control whether the corresponding device is in the normal state or quiescent state. Once all the devices in the same domain are in the quiescent state, the controller 12 can then control the shared power supply 8 or clock supply 10 to be cut off or gated, to remove the supply of power from the devices 4 within that domain 6.

The signals exchanged on the Q channel 15 for each device will now be described in more detail. Some domains, such as Domain 2 indicated in FIG. 1, may only include a single device D5 and for such domains the controller 12 may control transitions of the device between the quiescent state and the normal state independently of transitions of any other devices.

Figure 2:
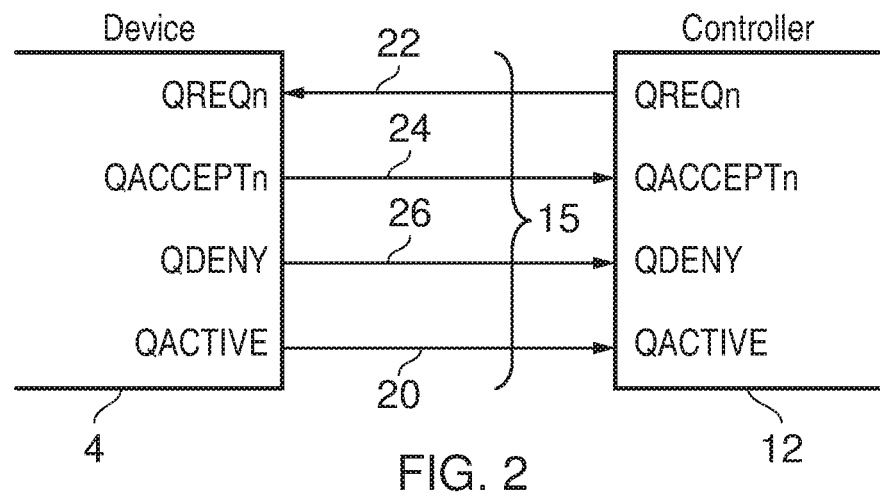
FIG. 2 shows an example of signals exchanged between a device and a controller for controlling transitions between the normal state and quiescent state.

FIG. 2 shows the signals transmitted on the Q channel 15 between a device 4 and the controller 12. An active signal 20, referred to as QACTIVE, can be driven HIGH by a device 4 in any state to indicate that it has operations to perform. When QACTIVE is driven LOW by a device 4 it is a hint, not a guarantee, that the device might accept a quiescence request. The QACTIVE signal from a device can be composed from a number of source signals. To provide wake-up capabilities, these can include device input signals. The final QACTIVE signal is driven either directly by a register or by a number of registers whose outputs are combined using a logical OR. Some of the devices may have some circuitry which remains powered or clocked when the rest of the device is in the power saving state, for asserting the QACTIVE signal when the device needs to become operational again (e.g. when a request for activity is received from another device). For other devices, if the device 4 is itself unable to assert QACTIVE HIGH, in the absence of the resource managed according to the interface (e.g. when the device 4 is in the power saving state it may not be able to assert QACTIVE itself), there may be provided a system dependent method to facilitate wakeup outside of the device. For example, this could be a QACTIVE signal 20 from another device combined at the controller 12 with the device QACTIVE.

A handshake mechanism is provided to manage device quiescence and guarantees safe state transitions. The handshake signals include:

A quiescence request signal 22, QREQn, driven by the controller 12.

An acknowledgement signal pair including an accept signal 24, QACCEPTn, and a deny signal 26, QDENY, which are driven back to the controller 12 by the device 4 to indicate acceptance or denial of a request. The acknowledgement signals are organized such that only one of them changes per handshake transition. This allows the interface 15 to be implemented safely across asynchronous boundaries. QACCEPTn 24 is used to accept a request. QDENY 26 is used to deny a request. The QACCEPTn 24 and QDENY 26 signals from a device 4 and the QREQn signal 22 from a controller 12 are driven by registers. The denial mechanism means a device can maintain an operational state while having a mechanism by which it can promptly complete the handshake of a quiescence request. The polarities of the handshake signals are organized to provide a quiescent state where all the signals on the interface 15 are LOW. This facilitates simple default isolation rules.

The handshake signal states are independent of the state of QACTIVE 20. Therefore, transitions on QACTIVE 20 are not restricted by the values on QREQn 22 or on the QACCEPTn and QDENY output pair 24, 26. The controller 12 can guarantee clock supply or power availability according to the handshake interface state. Each of the signals 20, 22, 24, 26 is asynchronous.

Figure 3:
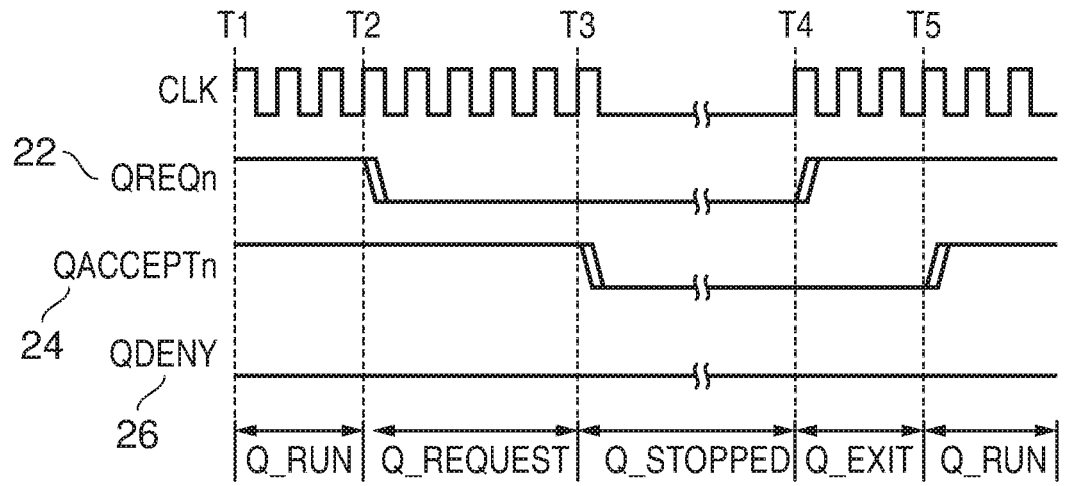
FIG. 3 shows an example of a device accepting a request to enter the quiescent state.

FIG. 3 shows a handshake sequence for an accepted quiescence request. It includes the activity of an optional controller-supplied clock that is managed according to the interface semantics. FIG. 3 omits QACTIVE 20 because, although QACTIVE 20 can act as a stimulus for the controller to change handshake state, it is independent of the handshake. All handshake state changes can be initiated by the controller 12 alone. The transitions shown in FIG. 3 are:

At T1, QREQn 22 and QACCEPTn 24 are both HIGH. This state is referred to as Q_RUN and the device 4 is operational. QDENY 26 is LOW in Q_RUN At T2, QREQn 22 is driven LOW by the controller 12, requesting entry to a quiescent state. This state is referred to as Q_REQUEST. The device 4 remains operational.

At T3, the device 4 responds to the quiescence request by driving QACCEPTn 24 LOW. QDENY 26 remains LOW. This state is referred to as Q_STOPPED. The device is not operational. This is the only state where the controller 12 does not guarantee the availability of any clock supply 10 or power supply 8 that is managed using the Q channel interface. Hence, as shown in FIG. 3 between T3 and T4, the clock signal CLK to the device 4 may be stopped.

At T4, the controller drives QREQn 22 HIGH to request exit from the quiescent state. Both acknowledgement signals 24, 26 remain LOW. This state is referred to as Q_EXIT. Any clock or power supply managed by the interface is guaranteed after an implementation-dependent delay.

At T5, the device responds to the controller with QACCEPTn 24 HIGH, and QDENY 26 remains LOW. The interface has returned to the state Q_RUN, as at T1.

Figure 4:
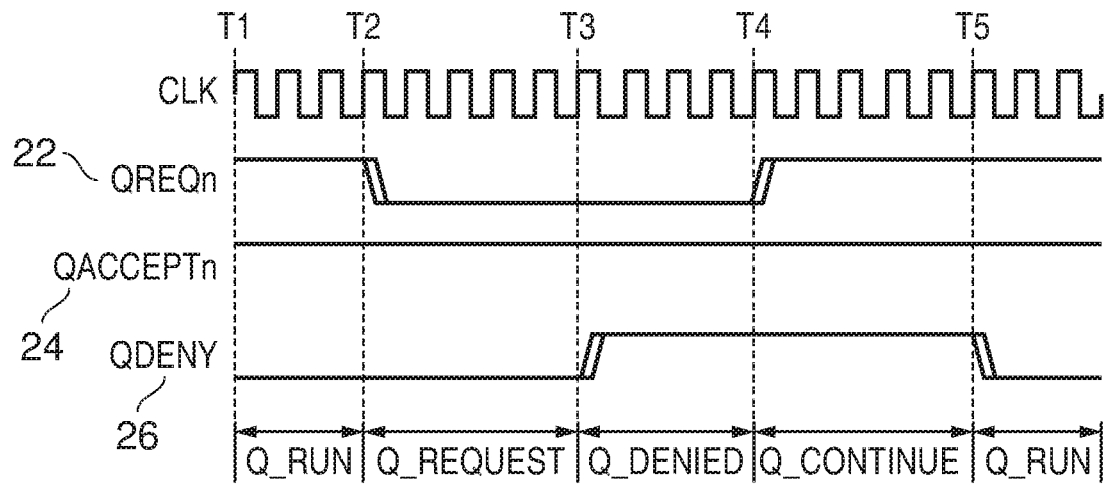
FIG. 4 shows an example of a device denying a request to enter the quiescent state.

FIG. 4 shows a handshake sequence for a denied quiescence request. It includes the activity of an optional controller-supplied clock that is managed according to the interface semantics.

The sequence from T1 to T2 is identical to that shown in FIG. 3.

At T3 the device drives QDENY 26 HIGH whilst QACCEPTn 24 remains HIGH. This state is referred to as Q_DENIED. The device 4 remains operational and the controller guarantees any clock or power supply managed by the interface. Hence, following T3 the clock CLK continues to be supplied.

At T4 the controller 12 drives QREQn 22 HIGH. This state is referred to as Q_CONTINUE and is in response to the quiescence request denial at T3. The device remains operational.

At T5 the device drives QDENY 26 LOW. The interface has returned to the state Q_RUN, as at T1.

Hence, by using the deny signal 26 the device 4 can deny a request to enter the quiescent state and can remain in the normal state.

Figure 5:
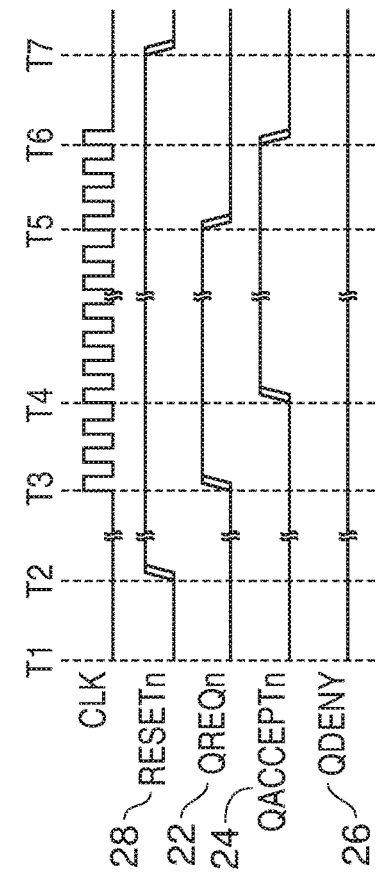
FIGS. 5 and 6 show examples of resetting a device.
Figure 6:
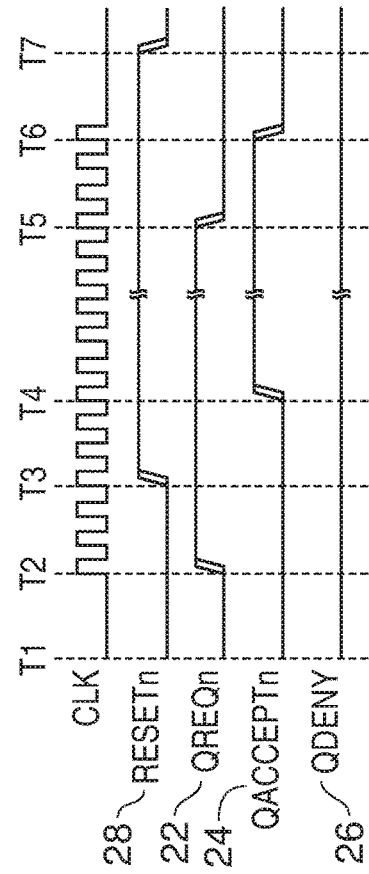

FIGS. 5 and 6 show examples of a procedure for device reset, which can be used to reset a device to a known state. The reset may be triggered by a reset signal 28 which may transmitted by the controller 12. At reset assertion a device may drive both QACCEPTn 24 and QDENY 26 LOW. QACTIVE 20 can reset LOW or HIGH. If the device needs to perform start-up operations on exit from reset then it can reset QACTIVE 20 HIGH, otherwise QACTIVE 20 may be reset LOW. A controller can release a device from reset with either: QREQn LOW, with the interface in Q_STOPPED state, or QREQn HIGH, with the interface in Q_EXIT state, provided any clock or power supply guarantee is met. A controller may only assert a device reset when the interface is in the Q_STOPPED state. This is consistent with the recommendation to isolate all signals LOW at power boundaries.

FIG. 5 shows a reset exit sequence into the Q_STOPPED state with QREQn LOW. At some time after reset deassertion the interface progresses to Q_RUN, possibly in response to a QACTIVE assertion. It then stays active for a time before re-entering the quiescent Q_STOPPED state, after which reset is asserted.

FIG. 6 shows a reset exit sequence into the Q_EXIT state with QREQn HIGH. Once the reset is released, the interface responds to the QREQn HIGH signal and progresses to Q_RUN. It then stays active for a time before re-entering the quiescent Q_STOPPED state, after which reset is asserted.

The table in FIG. 7 summarizes the interface states and device availability. If a device does not implement a denial mechanism, then QDENY is tied LOW or absent, and the first four states represent the complete set. FIG. 8 is a state diagram showing the possible handshake sequences in terms of the signal states and interface states.

The handshake signaling rules are:
QREQn can only transition from HIGH to LOW when QACCEPTn is HIGH and QDENY is LOW.
QREQn can only transition from LOW to HIGH when either:
QACCEPTn and QDENY are both LOW.
QACCEPTn and QDENY are both HIGH.
QACCEPTn can only transition from HIGH to LOW when QREQn is LOW and QDENY is LOW.
QACCEPTn can only transition from LOW to HIGH when QREQn is HIGH and QDENY is LOW.
QDENY can only transition from HIGH to LOW when QREQn is HIGH and QACCEPTn is HIGH.
QDENY can only transition from LOW to HIGH when QREQn is LOW and QACCEPTn is HIGH.

A controller 12 can make any policy decision concerning its management of QREQn irrespective of any activity on QACTIVE. However, some possible Q-Channel policies that provide useful solutions are described below.

Asserting QACTIVE HIGH can be used as a stimulus for the controller to exit the Q_STOPPED state. The controller 12 responds by driving QREQn HIGH, exiting the quiescent state.

Detecting QACTIVE LOW can be used, by a controller in the Q_RUN state, as a criterion for initiating a quiescence request. However, the controller can change the state of QREQn from HIGH to LOW at any time while it is in the Q_RUN state. Once QREQn is driven LOW, the controller does not have to consider the state of QACTIVE, because QREQn cannot be driven HIGH until the handshake is completed by the device with either an acceptance or denial response.

Figure 9:
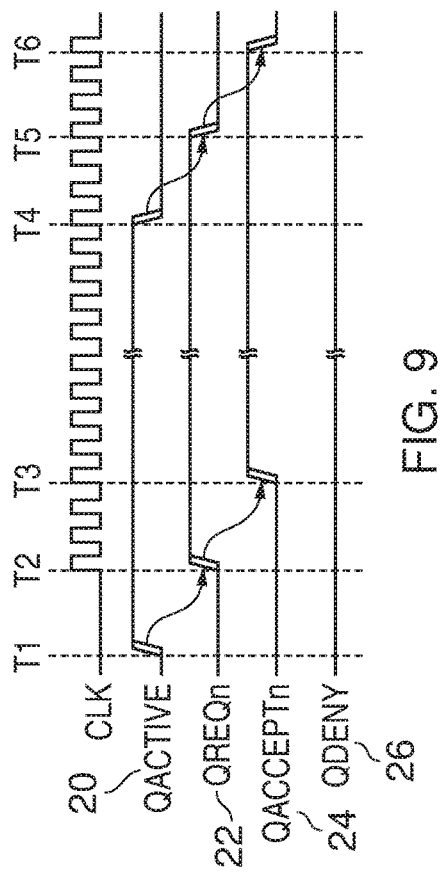
FIGS. 9 and 10 show examples of managing quiescent state entry or exit based on an active signal provided by the device.

FIG. 9 shows a controller policy led by device transitions on QACTIVE. When the interface is in Q_STOPPED state a HIGH level on QACTIVE stimulates an exit from the quiescent state. When the interface is in a Q_RUN state a LOW level on QACTIVE causes the controller to make a quiescence request.

Figure 10:
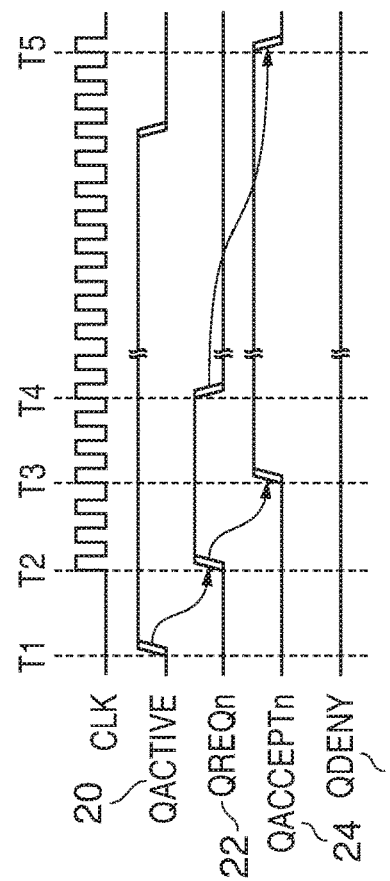

FIG. 10 shows a controller policy where the exit from quiescence is led by the device 4 but the entry is initiated by the controller 12. This might be a request for the device to complete its current actions, and not accept more, before becoming quiescent.

Some types of devices may not implement all of the signals of the Q channel as shown in FIG. 2. The following section describes the permitted signal subsets which a device may support:

Unused Interface
An unused interface has the QREQn input tied HIGH if the device is to be operational. The system has full responsibility for managing the availability of the device by means outside the interface control.

Omission of QDENY
A device that has no requirement to deny a quiescence request can omit QDENY with an implicit tie LOW. This subset also offers backward compatibility with devices that have no requirement to deny a quiescence request.

Omission of QACTIVE
In some applications the initiation of or exit from device quiescence might not require any information from the device. In this case, the device can omit QACTIVE. QACTIVE must be tied LOW at the controller.

QACTIVE-Only Interface
A device can present a minimum interface comprising only QACTIVE to indicate a requirement to perform operations, without any associated handshake. Typically this minimum interface might be used to provide an initial wakeup indication. However it does not provide any means to guarantee any clock or power availability. The indication provided by QACTIVE alone may be combined with other arrangements of either hardware, software, or both to provide working solutions. One arrangement might be to permit a device attached to a controller through a QACTIVE-only interface to wake a second device, which itself has a Q-Channel interface to the same controller that is used to guarantee clock or power availability.

Hence, in domains including a single device 4, the controller 12 may control that device's entry to and exit from the quiescent state as discussed above.

When there are multiple devices 4 in a domain 6, each device can accept or deny the request independently dependent on their internal activity. However as mentioned above, the denial feature is optional and not all components support it. In the case where a component does not support the deny signal, if the device has internal activity it will delay accepting the request until it is in the correct idle state.

For a controller component 12 which controls a domain 6 including multiple devices 4 with a shared clock or power supply, one approach may be to handle each channel 15 independently using the rules defined above, and to combine only the enabling/disabling of the clock or power supply for the domain. However, there is no power advantage from individual components of the domain entering a quiescent state as the common clock or power supply still needs to be provided if another component is still in the normal state. Therefore, it would be preferable to control all channels simultaneously when all components in the domain indicate they are idle. This is preferable to handling individual Q-Channels as it only makes quiescent requests when all components in the system are idle and therefore removes the latency of wake-ups of individual components and thrashing of the interfaces when a component is idle but needs to wake up as other components are still active.

Hence, the controller in a domain comprising multiple devices may manage a common state transition process as follows:
The QACTIVE(s) 20 from each device 4 within the domain are combined so that a quiescent entry request is only made when all components are idle, i.e. all QACTIVE(s) are LOW. Additionally hysteresis can be added to either each QACTIVE individually, or to the combined QACTIVE(s) before a quiescent request is made. For example, the controller 12 may wait for a predetermined delay after all the QACTIVE(s) become low before issuing the quiescent entry request, to reduce thrashing between states.
When the controller 12 is making a quiescent request to the components 4, i.e. where some Q-Channels might have an outstanding request while some might have accepted, then a QACTIVE HIGH from any component which does not have the deny feature initiates the moving of all Q-Channels within the domain back to the running (normal) state. This allows any dependent operations to be completed on devices which may have been quiescent.

If any component issues a denial response using QDENY 26 this also initiates a quiescent exit on all Q-Channels within the domain. The controller therefore, in the correct protocol manner, moves all Q-Channels back to the running state. At this point can another quiescent request be made.

Any component without the denial feature which is in a quiescence request state, but active so it will not accept the request, remains that way until it can accept the request. This maintains the Q-Channel protocol as discussed above.

Figure 11:
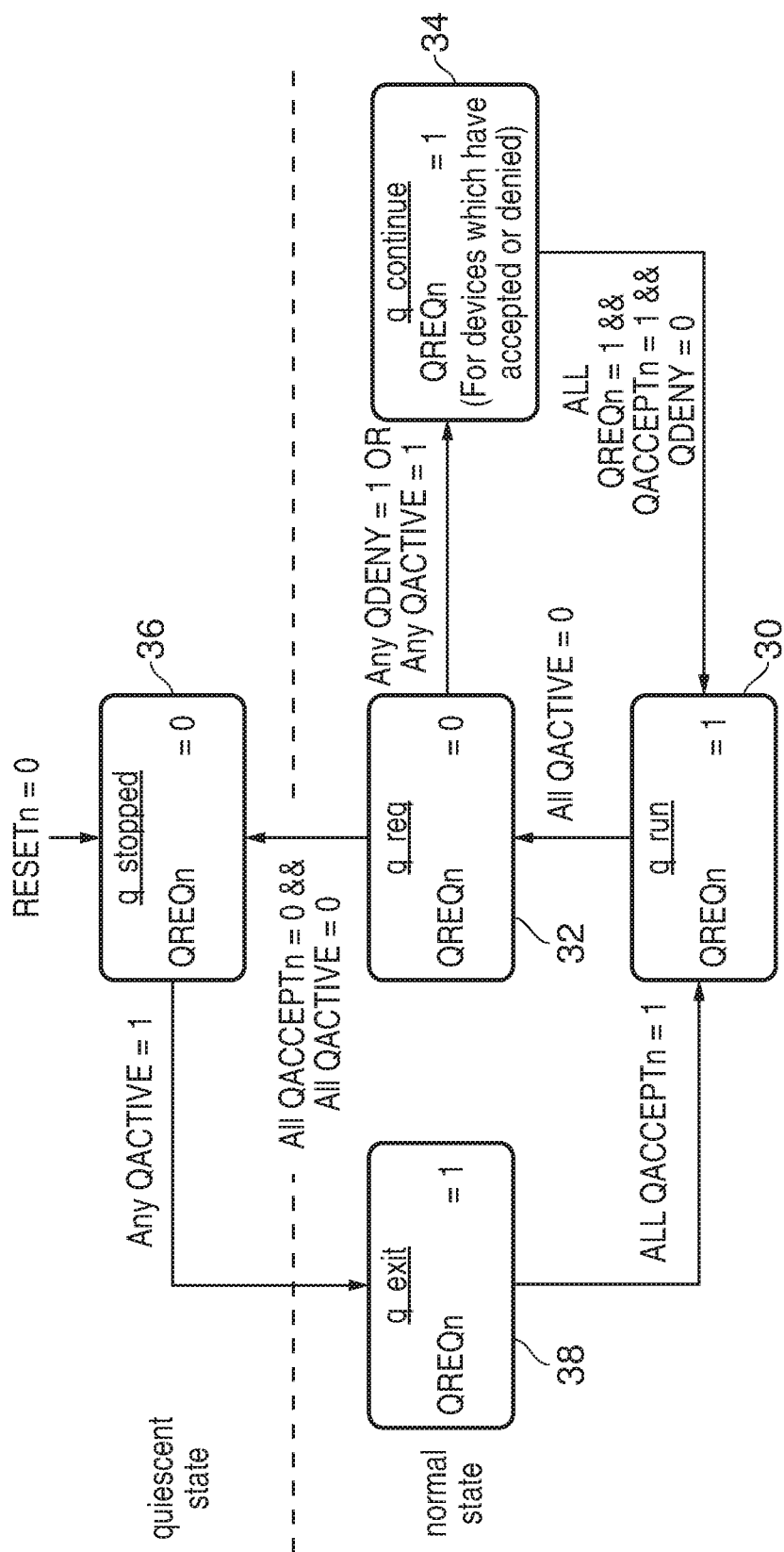
FIG. 11 is a state diagram showing an example of a common state transition process for transitioning a group of devices between the normal state and the quiescent state.

FIG. 11 shows a state diagram representing a common state transition process between the quiescent state and the normal state can be managed by the controller 12 in a domain having multiple devices 4. The states shown in FIG. 11 essentially correspond to the states of FIG. 8, but unlike in FIG. 8, in FIG. 11 the state transitions depend on the preference indications (QACCEPT or QACTIVE/QDENY) issued by each of the devices 4 within the domain 6.

In the q_run state 30, all devices are operational and QREQn is HIGH. When all the QACTIVE signals 20 from the devices 4 in the current domain are LOW, the controller 12 asserts QREQn 22 LOW and the devices transition to the q_req state 32 in which the devices are still operational but are requested to become quiescent. This initiates a common state transition process for transitioning each device to the quiescent state. If any of the devices 4 denies the request by asserting QDENY 26 HIGH, or any of the QACTIVE signals 20 becomes HIGH, all the devices 4 transition to the q_continue state 34 in which the devices remain operational and the quiescence request is denied. QREQn 22 is brought HIGH to request that any devices which have already accepted the request are brought back to the normal state, and then each device returns to the normal state by bringing QACCEPTn 24 HIGH and QDENY 26 LOW, so that the domain returns to the q_run state 30.

On the other hand, if following the Q_req state 32, all of the devices accept the request (i.e. all QACCEPTn signals 24 are LOW and all QACTIVE signals 20 are LOW), then the devices transition to the q_stopped state 36, in which the devices are all in the quiescent state. This is the only state 36 in FIG. 11 in which the devices can safely be placed in the power saving state by isolating them from the shared power supply 8 or clock supply 10. If any device 4 asserts QACTIVE 20 HIGH to indicate that they have activity to perform, then the clock or power supply is restored and the controller 12 brings QREQn HIGH to request exit from the quiescent state. The devices move to the q_exit state 38. Once each device 4 has brought QACCEPTn HIGH to acknowledge that it is back in the normal state, then the state machine returns to the q_run state 30.

Hence, as shown in FIG. 11, the transitions between quiescent state (q_stopped state 36) and the normal state (any other state) may be managed according to a common process for a number of devices, based on the individual Q channel 15 signals sent by each device. While FIG. 11 shows a common state transition process for all of the devices within a domain, on transitioning between states not all of the devices 4 may change states simultaneously. As discussed below, in some cases the transitions between states may be controlled sequentially so that one device transitions before another.

The approach shown in FIG. 11 is scalable to any number of devices.

Figure 12:
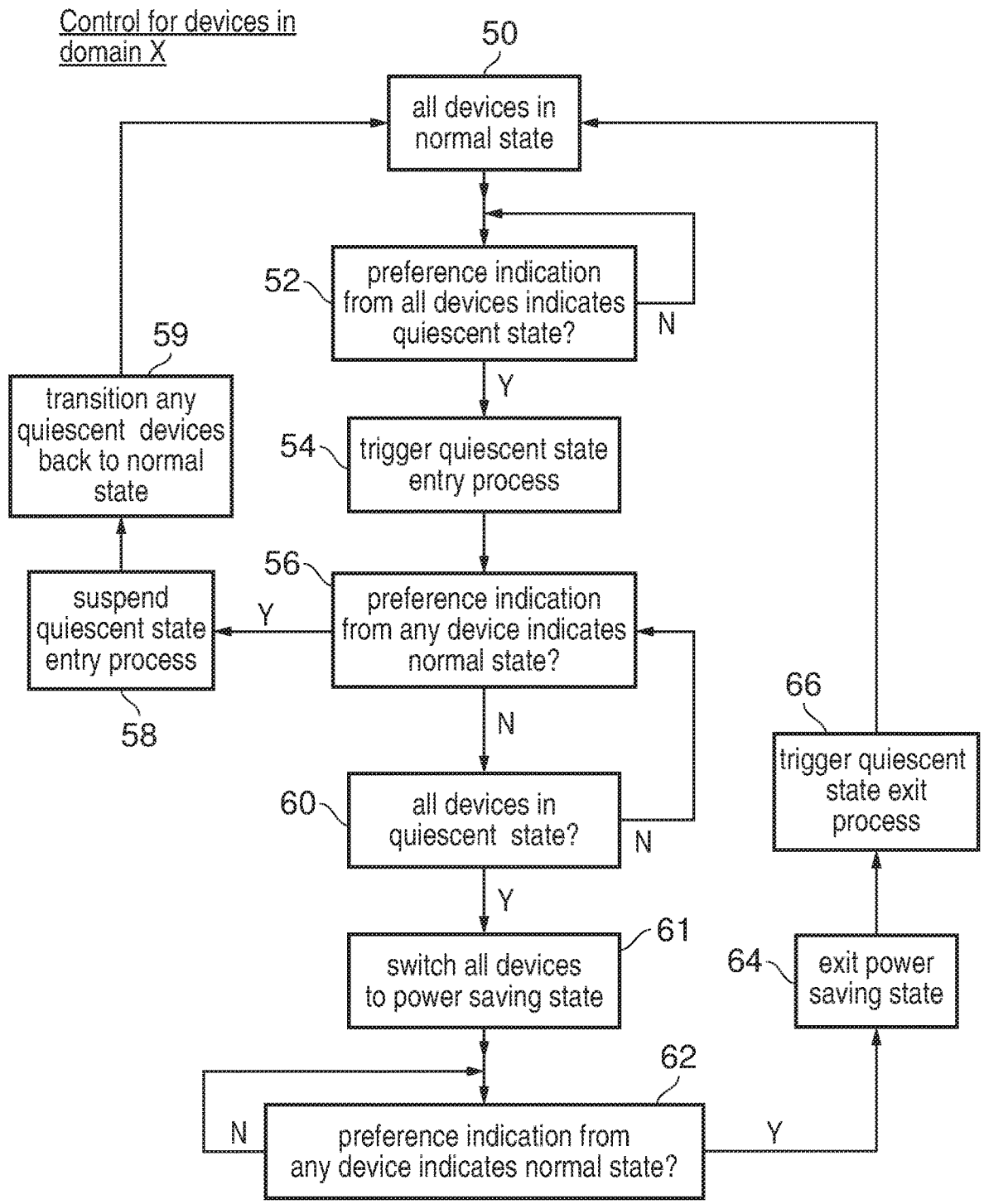
FIG. 12 is a flow diagram illustrating an example of controlling the common state transition process.

FIG. 12 is a flow diagram illustrating an example of controlling state transitions in common for each of the devices within a given domain. At step 50 all of the devices are in the normal state. At step 52, the controller 12 determines whether each of the devices in the domain 6 have issued preference indications indicating a preference for the quiescent state. The preference indication could be the QACTIVE signal or the QACCEPT or QDENY signals for example. If any device 4 does not indicate a preference for the quiescent state then the devices remain in the normal state 50. Once all of the devices in the domain indicate a preference for the quiescent state then at step 54 the quiescent state entry process is triggered. This may correspond to asserting the quiescent state entry request or may correspond to actually completing the quiescent state entry if the preference indication already received was the acceptance signal QACCEPT. At step 56 the controller 12 determines whether the preference indication from any device indicates a preference for the normal state before the quiescent state entry process has completed. If so, then at step 58 the quiescent state entry process is suspended and at step 59 any quiescent devices which have already switched the quiescent state are transitioned back to the normal state. For example this may correspond to bringing high the QREQn signal to indicate that the devices are no longer requested to enter the quiescent state. The method then returns to step 50 once all of the devices are back in the normal state.

On the other hand if at step 56 no preference indication corresponding to the normal state has been received then at step 60 it is determined whether all of the devices are now in the quiescent state. If not then the method returns to step 56 and continues looping round steps 56 and 60 until all the devices are quiescent or the process has been suspended at step 58.

Once all the devices are in the quiescent state, at step 61 the devices are all switched to the power saving state, by gating the power supply 8 or clock supply 10 to those devices. At step 62 the controller 12 continues to monitor the indications from each device 4 to determine whether any device indicates a preference for the normal state. For example, this could be monitoring of the QACTIVE signal from each device. If no such indication is received, then the devices remain in the power saving state. However, if a device 4 indicates a preference for the normal state, then the method moves to step 64 where the power or clock supply is restored and the devices exit the power saving state. At step 66 the controller 12 triggers a quiescent state exit process for each device in the domain (e.g. by asserting high the QREQn signal for each device). Once all of the devices have confirmed exit from the quiescent state (e.g. by bringing high the QACCEPTn signal) then the devices return to the normal state and the method returns to step 50.

The examples above describe a common process for transitioning a number of devices between the normal state and quiescent state. Where there are dependencies between components which support Q-Channel based power or clock gating the sequencing of entry to and exit from the quiescent state may be required to avoid possible deadlock or loss of information.

Figure 13:
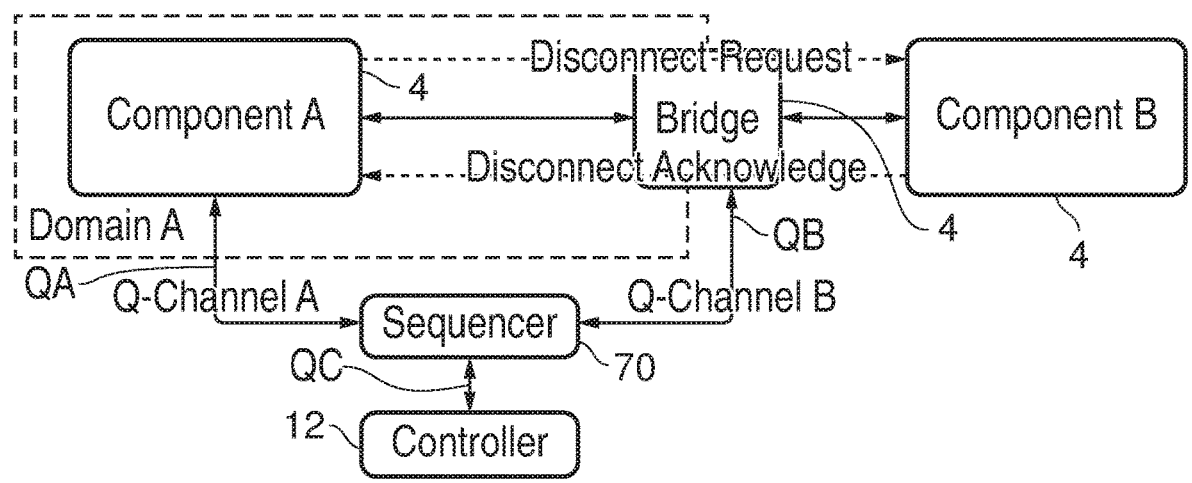
FIGS. 13 and 14 show examples of a sequencer for controlling a sequential state transition process for transitioning each device between the normal state and the quiescent state.

One example of a scenario where this may be useful is in the quiescent control of a component, or group of components, which communicate to other components, outside the power or clock domain, through one or more bridges. Prior to power down or clock gating, the component(s) within the domain and the bridges are required to be entered into a quiescent state. However some communication may be required with a component outside of the domain between the Q-Channel quiescent entry request and the acceptance. For example, FIG. 13 shows an example of two components 4 in two different power domains communicating through a bridge. If the bridge enters the quiescent state before the component A, then the component A may issue the disconnect request and may be waiting indefinitely for the disconnect acknowledge, which may cause a deadlock.

To address this issue, as shown in FIG. 13 a transition sequencer 70 may be provided between the controller 12 and the devices 4. A control Q-channel QC is provided between the controller 12 and the sequencer 70, and device Q-channels QA, QB are provided between the sequencer and component A and bridge respectively. Each of the Q-channels QC, QA and QB may comprise the signals shown in FIG. 2.

The sequencer 70 may control quiescent state entry for the devices 4 according to a predetermined sequence, which may be hardwired or defined by programmable data within the sequencer 70. For example, in the current example the sequence may be such that component A is transitioned to the quiescent state before the bridge. Hence, the quiescent state entry process may proceed as follows:

1. Controller 12 sends a quiescence request to the Sequencer 70.
2. Sequencer 70 sends quiescence request to Component A using Q-Channel A.
3. Component A sends a disconnect request to Component B via the bridge.
4. Component B sends a disconnect acknowledge back to Component A via the bridge.
5. Component A accepts the quiescence request.
6. Sequencer 70 sends quiescence request to the Bridge using Q-Channel B.
7. Bridge accepts the quiescence request.
8. Sequencer 70 accepts quiescence request from the Controller 12.

Without the Sequencer 70, the quiescence requests could be sent on both Q-Channel A and B at the same time which could lead to the bridge entering the quiescent state, and stalling any pending transactions, before Component A and B have completed their communication. This could lead to a live-lock or dead-lock situation. This can be avoided by providing a sequencer 70 for controlling sequential quiescent state entry.

Similarly, on exiting the quiescent state, the sequencer 70 can handle transitions of the bridge and component A in the opposite order, so that the bridge will be active by the time the component A is brought out of the quiescent state, so the bridge is available for transmitting signals to component B if necessary.

Figure 14:
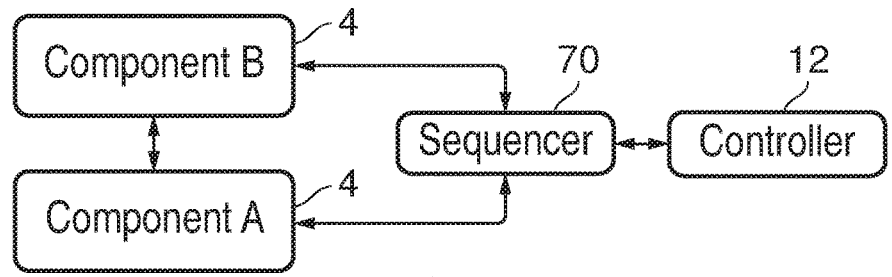

Another example scenario where the sequencer 70 can be useful is shown in FIG. 14. There may be dynamic clock control for a group of components 4 which communicate using a protocol which is not capable of back pressure, i.e. the transaction cannot be stalled until the receiving domain is ready. If both the sender and the receiver of the message are exiting a quiescent state simultaneously it is not possible to guarantee that the receiver is in a fully ready state before the sender. This could lead to the loss of message if a message is sent but ignored by the receiver as it not in a fully ready state (and has no backpressure mechanism). With the use of a sequencer 70 the receiver can be guaranteed to be in an operational state before the sender.

Figure 20:
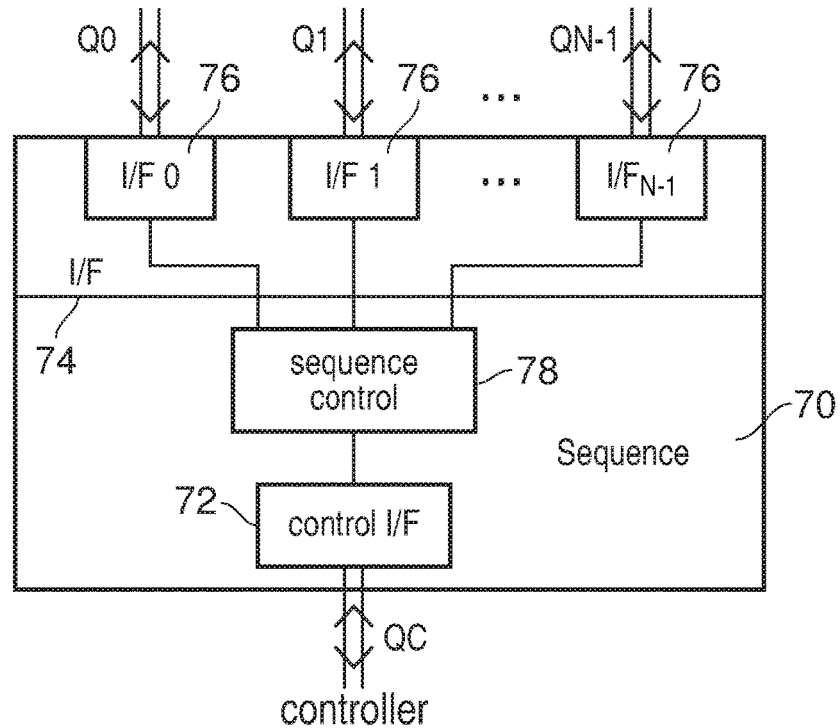
FIG. 20 schematically illustrates an example of transition sequencing circuitry.

While FIGS. 13 and 14 show examples with the sequencer controlling two Q-channels, more generally this is scalable to any number of Q-channels. For example, as shown in FIG. 20, the sequencer 70 may have a control interface 72 for a single control Q-Channel (CTRLQ) QC and device interface portion 74 which includes interfaces 76 for a configurable number of component Q-Channels (DEVQ) Q0, Q1, . . . , QN−1. The CTRLQ interface 72 is connected to a controller 12 whilst the DEVQ interfaces 76 are connected to the components 4 which are required to be sequenced. The sequencer 70 has control circuitry 78 which controls the operations discussed below. In some cases, the sequencer 70 may combine the QACTIVE indications from each component Q-Channel interface 76 with a logical OR operation and output the result as the QACTIVE signal 20 on the control Q-channel interface 72, so that the controller 12 receives an indication which is HIGH if any of the individual components have asserted their QACTIVE signal 20.

The examples in FIGS. 13 and 14 show the sequencer 70 as being provided separate from the controller 12. This has the advantage that the controller can simply manage a single Q-channel QC in substantially the same away as if the controller was controlling a single device (as in Domain 2 of FIG. 1 for example). In this way, the controller does not need to consider how many devices are present, as this can be managed by the sequencer 70 alone. Hence, the sequencer 70 may in some embodiments be considered to be the controller which manages the common state transition process discussed above with respect to FIGS. 11 and 12.

Nevertheless, in other examples a single combined control unit may include the functionality of both the controller 12 and the sequencer 70, so that it performs both the overall control of when the devices in that domain are to enter/exit the quiescent state, and the control of the sequence in which devices are transitioned between states.

Figure 15:
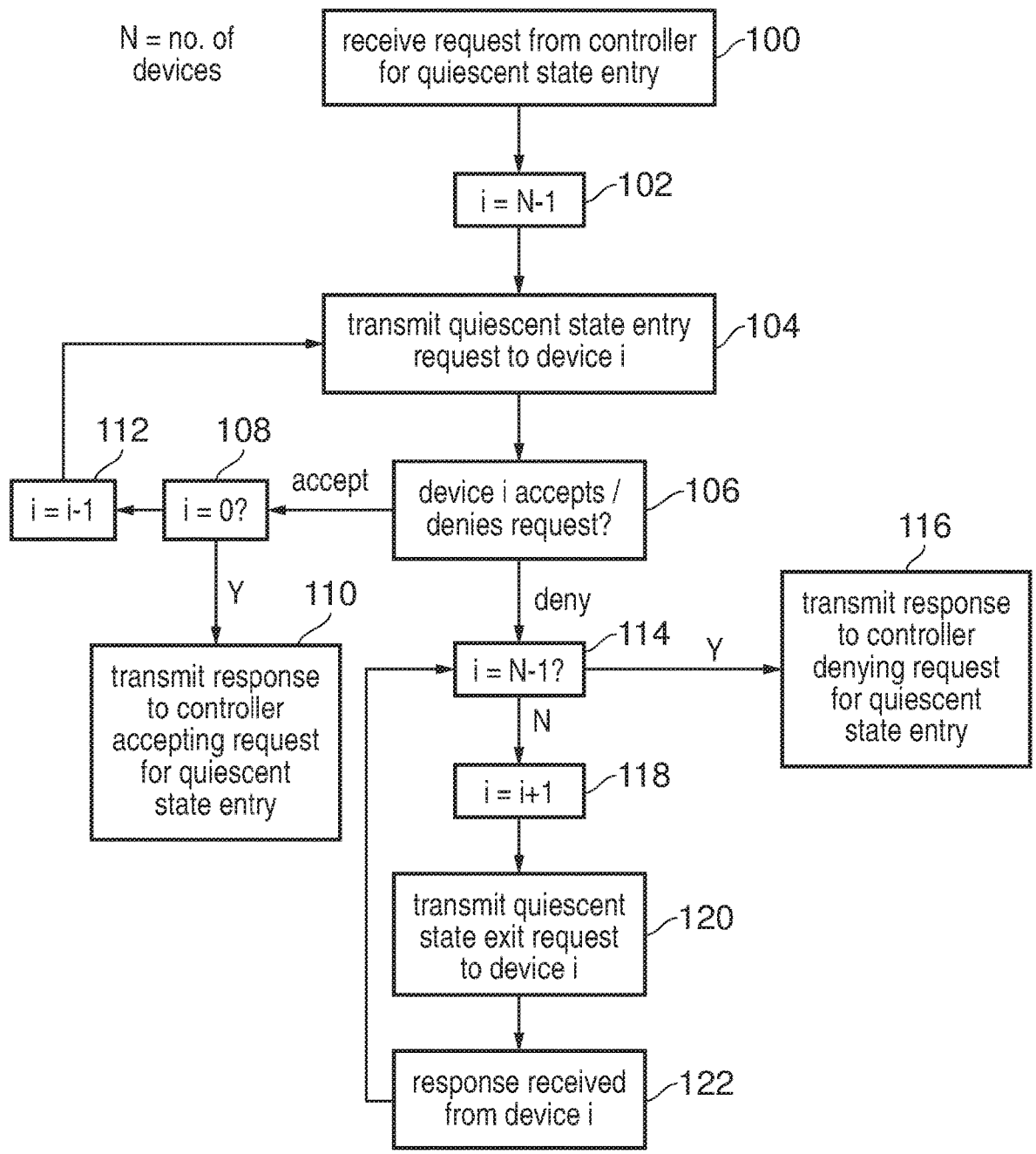
FIG. 15 is a flow diagram showing an example of controlling sequential quiescent state entry.

FIG. 15 is a flow diagram illustrating an example of a sequential quiescent state entry process. At step 100, the sequencer receives a request from the controller for quiescent state entry. The devices controlled by the sequencer 70 are associated with a certain sequence, such that each device has a position in a sequence from device 0 to device N−1, where N is the number of devices. Which device is regarded as device 0, device 1, etc may be set during the manufacture of the apparatus 2 or may be programmable.

At step 102, the quiescent state entry process starts with i=N−1, and step 104 the sequencer 70 transmits a quiescent state entry request to device i. At step 106, the sequencer 70 determines whether device i has accepted or denied the request (e.g. based on the QACCEPTn signal for that device's Q-channel). If the request is accepted, then at step 108 it is determined whether i=0 (i.e. all of the devices in the sequence have now accepted the request), and if so then at step 110 the sequencer transmits a response to the controller indicating that the request for quiescent state entry has been accepted (e.g. the sequencer may bring QACCEPTn LOW on the control Q-channel QC). If i>0, i.e. not all the devices have yet accepted the request to enter the quiescent state, then at step 110 i is decremented and the method returns to step 104 where another quiescent state entry request is sent to the next device in the sequence.

If at step 106 it is determined that a device has denied the request, then the quiescent state entry process is suspended. At step 114 it is determined whether i=N−1, i.e. the device which denied the request was the first device to which a request was sent. If so, then at step 116 a response is transmitted to the controller denying the request for quiescent state entry (e.g. the sequencer can bring HIGH the QDENY signal on the control Q-channel QC). If i<N−1 then this means that at least one device has already accepted the quiescent state entry request, and so some steps are performed to bring this device back to the normal state. At step 118, i is incremented, and at step 120 a quiescent state exit request is transmitted to device i (e.g. by bringing HIGH the QREQn signal for that device's Q-channel). At step 122, a response is received from that device (e.g. the device brings HIGH the QACCEPTn signal). The device is now back in the normal state. The method returns to step 114 and may loop through steps 114 to 122 several times if there is more than one device which had already transitioned to the quiescent state by the time another device denied the request. Eventually, all devices are back in the normal state and at step 116 the response is provided to the controller to indicate that the request for quiescent state entry has been denied.

Figure 16:
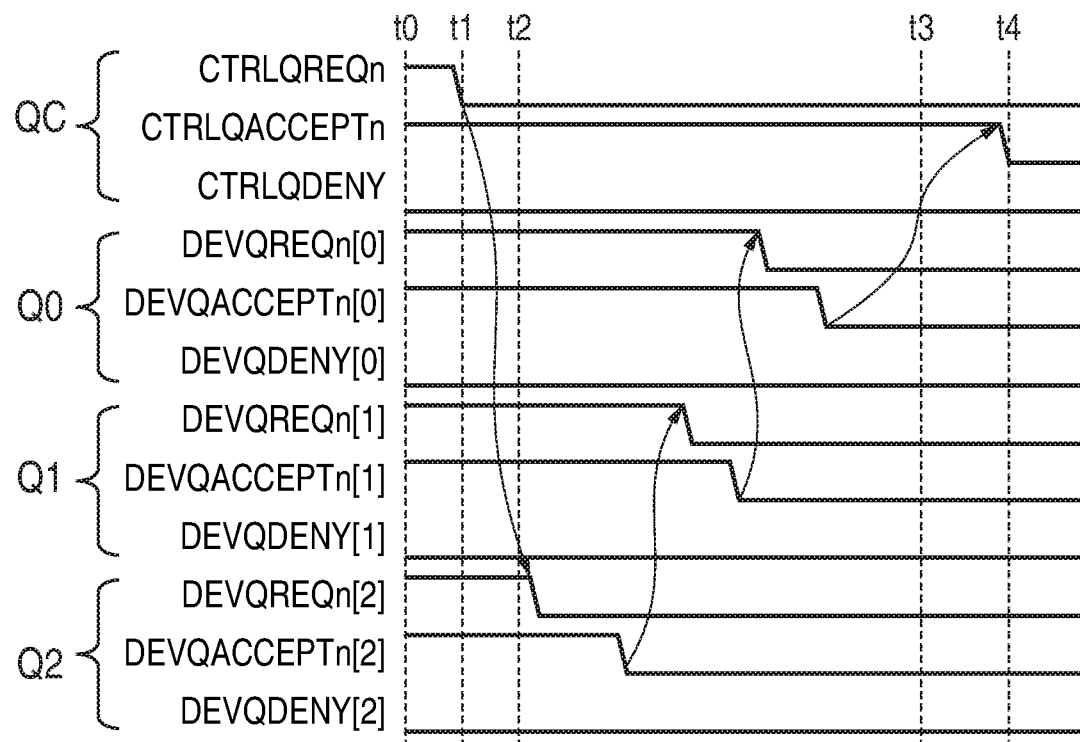
FIG. 16 is signal diagram showing an example of a sequential quiescent state entry.

FIG. 16 is a signal diagram showing an example of the sequential quiescent state entry process as controlled by the sequencer 70. FIG. 16 shows the QREQn, QACCEPTn and QDENY signals 22, 24, 26 on the control Q-channel QC and the component Q-channels Q0, Q1, Q2 for an example where there are three components 4 to be controlled by the sequencer. In this example the predetermined sequence for quiescent state entry is Q2, Q1, Q0. As shown in FIG. 16, on detection at time t1 of a quiescence entry request on the CTRLQ interface, the sequencer 70 brings low the QREQn signal on Q-channel Q2 corresponding to the first component in the sequence. When component 2 accepts the request by bringing low its QACCEPTn signal 24, the QREQn signal for the following component's Q-channel Q1 is brought low, and similarly acceptance of the request by component 1 triggers a request for component 0. Once all devices have accepted the quiescence request, at t4 the sequencer 70 brings low the QACCEPTn signal 24 on the control Q-channel QC, to signal that the initial request from the controller has been accepted. All devices are now in the quiescent state.

Figure 17:
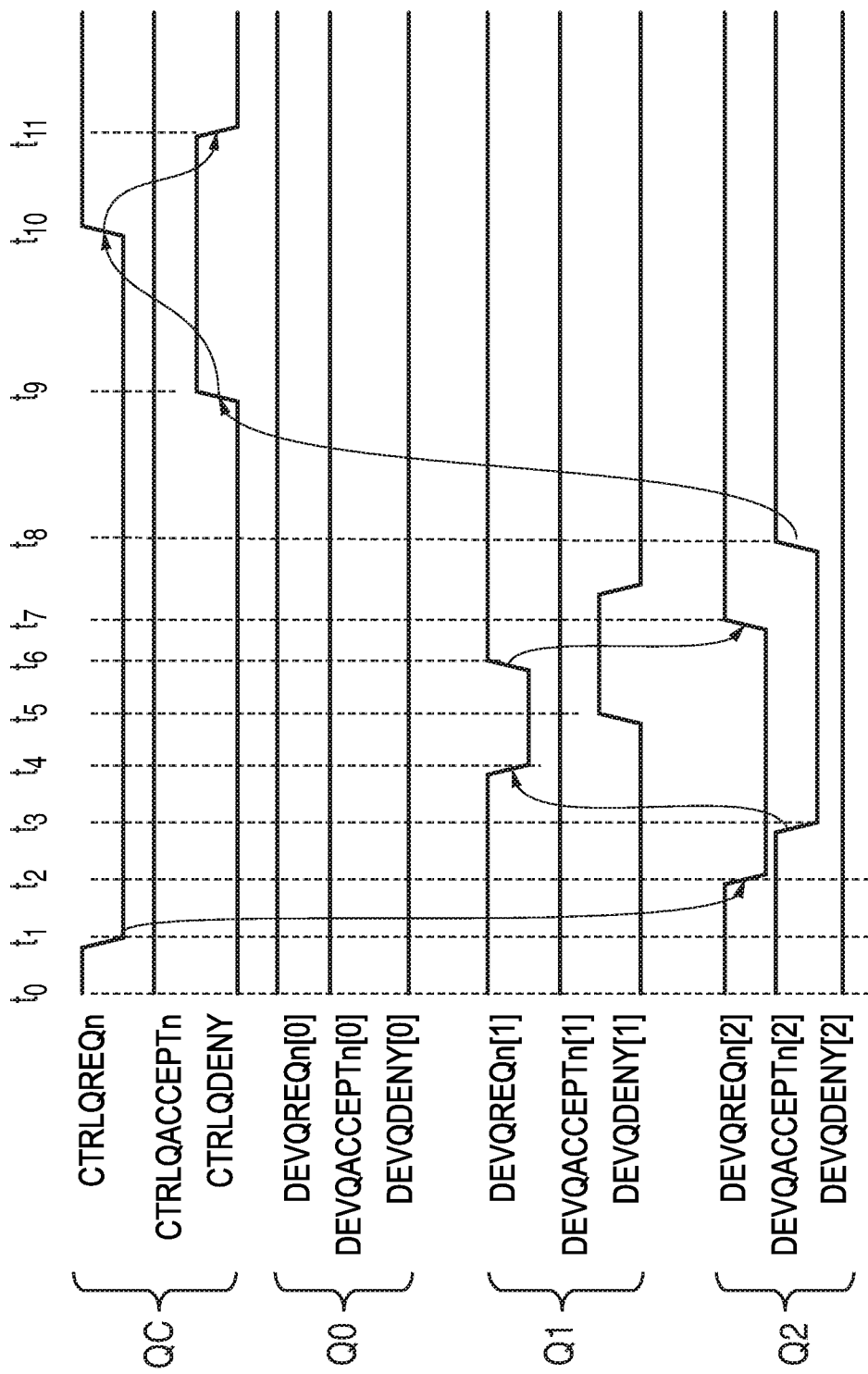
FIG. 17 is a signal diagram showing an example of aborting the sequential quiescent state entry when one of the devices denies the quiescent state entry request.

On the other hand, FIG. 17 shows a similar example in which one of the devices denies the quiescent state entry request. At this point, the Sequencer restores all devices which have previously accepted the quiescent request, and the component which has denied, back to the Q_RUN state, and issues a response to the controller denying the original request from the controller.

Hence, the initial part of FIG. 17 is the same as FIG. 16, in that the controller requests entry to the quiescent state at t1, triggering a request to component 2 at t2. This request is accepted by component 2 at t3, and this triggers a request to component 1 at t4. However, this time at time t5 the component 1 denies the request by bringing HIGH its QDENY signal 26. In response, the sequencer 70 brings HIGH the QREQn signal on Q-channels Q1 and Q2 at times t6, t7 respectively. At t8, the component 2 brings HIGH its QACCEPTn signal 24 to acknowledge the request to exit the quiescent state, and in response at t9 the sequencer 70 brings HIGH the QDENY signal 26 on the control Q-channel QC to signal to the controller that the request has been denied. In response, at t10 the controller 12 clears the outstanding quiescence request by bringing its QREQn signal 22 HIGH. At t11, in response to the quiescence request being cleared, the sequencer 70 brings LOW the QDENY signal 26 so that all signals are now back in the state shown at t0.

Figure 18:
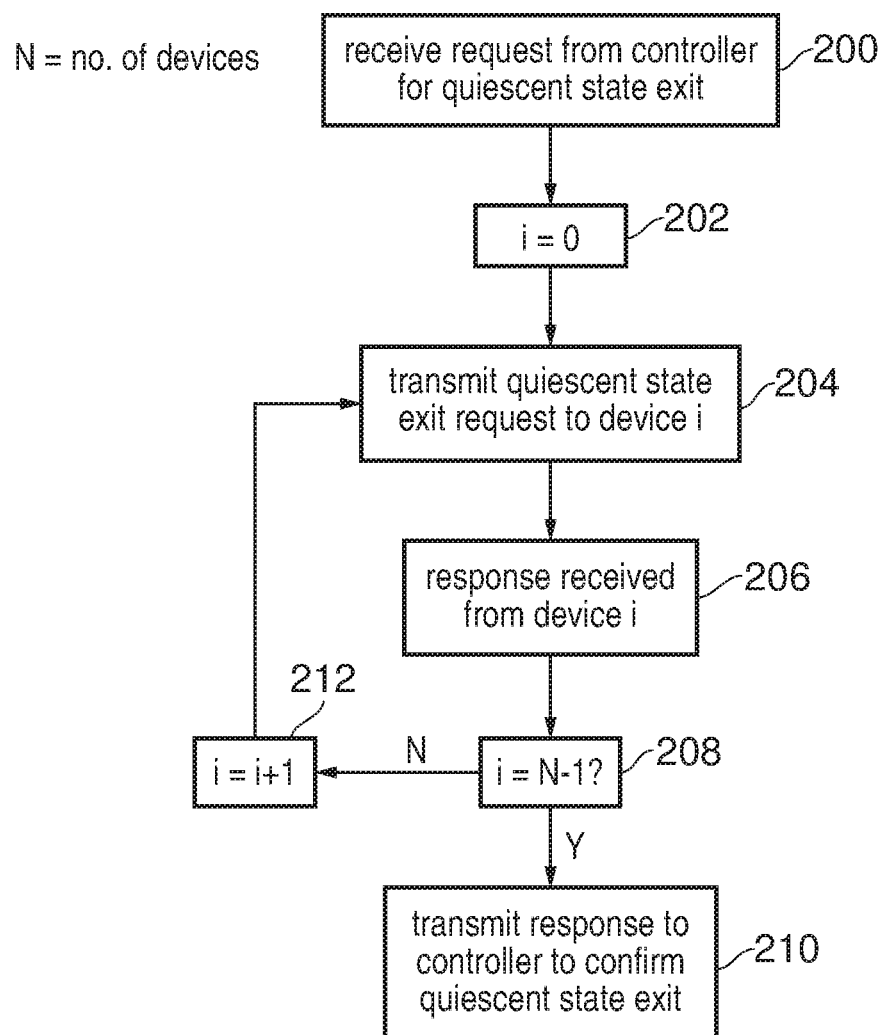
FIG. 18 is a flow diagram showing an example of a sequential quiescent state exit process.

FIG. 18 is a flow diagram showing an example of a quiescent state exit process. Again, the devices controlled by the sequencer 70 are transitioned in a predetermined sequence, but this time the sequence is the opposite sequence compared to quiescent state entry so that device 0 is brought out of the quiescent state before device 1, device 2, etc. This is because where a first device is dependent on a second device, when exiting the quiescent state it is preferable for the second device to be woken up before the first device, while on entering the quiescent state it is preferable for the first device to be quiescent before the second device, so that the second device is operational at the point when the first device may need to carry out actions to enter or exit the quiescent state.

At step 200, the sequencer 70 receives a request from the controller to exit the quiescent state (e.g. the controller brings the QREQn signal on the control Q-channel HIGH). At step 202, i=0 so that device 0 will be the first to exit the quiescent state. At step 204, the sequencer 70 transmits a quiescent state exit request to device i. Once the device has completed any actions required for exiting the quiescent state, it transmits a response (e.g. bringing high its QACCEPTn signal 24), which is received by the sequencer at step 206. At step 208, the sequencer determines whether i=N−1 (i.e. all devices have now confirmed exit from the quiescent state). If so, then at step 210 a response is transmitted to the controller 12 to confirm exit from the quiescent state (e.g. the sequencer 70 brings high the control Q-channel's QACCEPTn signal 24). If not all the devices have yet exited the quiescent state sequence, then at step 212 i is incremented, and the method returns to step 204 to issue the quiescent state exit request for the following device in the sequence.

Figure 19:
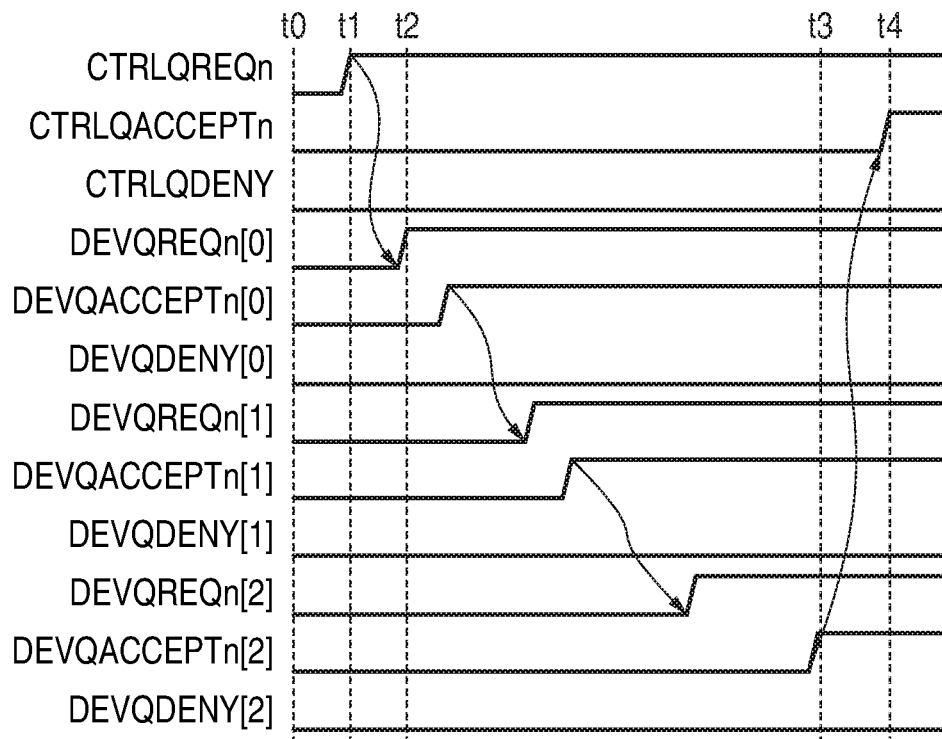
FIG. 19 is a signal diagram showing an example of sequential quiescent state exit.

FIG. 19 is a signal diagram showing the sequential quiescent state exit process. When a quiescence exit request is detected on the CTRLQ interface at t1, the Sequencer starts a quiescence exit request on each DEVQ interface in turn, starting with DEVQ0 at t2 and progressing to DEVQ<N−1> where N is the number of DEVQ interfaces. When the device connected to the DEVQ0 Q-Channel has accepted the exit request the Sequencer moves on to the next DEVQ Q-Channel. Once all DEVQ interfaces have accepted the quiescent exit request the Sequencer accepts the request on the CTRLQ Q-Channel.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

The invention claimed is:

1. A data processing apparatus comprising:
   a plurality of devices; and
   a controller configured to control transitions of the plurality of devices between a normal state and a quiescent state in which the device is ready for being placed in a power saving state;

wherein each device is configured to provide at least one preference indication indicative of a preference for that device to operate in the normal state or the quiescent state; and the controller is configured to control a common state transition process for transitioning each of said plurality of devices between the normal state and the quiescent state, in dependence on the at least one preference indication received from each of the plurality of devices;

wherein said common state transition process comprises one of:
- a quiescent state entry process for transitioning each of said plurality of devices from the normal state to the quiescent state; and
- a quiescent state exit process for transitioning each of said plurality of devices from the quiescent state to the normal state;

wherein the controller is configured to trigger the quiescent state exit process for transitioning each of said plurality of devices from the quiescent state to the normal state when a preference indication from any one of said plurality of devices indicates a preference to operate in the normal state.

2. The data processing apparatus according to claim 1, wherein for each device, the controller is configured to control whether that device is in the normal state or the quiescent state in dependence on the at least one preference indication received from each of the plurality of devices.

3. The data processing apparatus according to claim 1, wherein the controller is configured to trigger the quiescent state entry process for transitioning each of said plurality of devices from the normal state to the quiescent state, when said at least one preference indication from each of the plurality of devices indicates a preference to operate in the quiescent state.

4. The data processing apparatus according to claim 1, wherein the controller is configured to suspend the quiescent state entry process for transitioning each of said plurality of devices from the normal state to the quiescent state when said at least one preference indication from one of said plurality of devices indicates a preference to operate in the normal state.

5. The data processing apparatus according to claim 4, wherein following suspension of the quiescent state entry process, the controller is configured to return to the normal state any of the devices already transitioned to the quiescent state.

6. The data processing apparatus according to claim 1, wherein the at least one preference indication comprises at least one active signal indicative of whether there is activity to perform.

7. The data processing apparatus according to claim 1, wherein the at least one preference indication comprises at least one signal indicative of whether a request to enter the quiescent state is denied.

8. The data processing apparatus according to claim 1, wherein:
for a first type of device, the at least one preference indication comprises at least one active signal indicative of whether there is activity to perform; and
for a second type of device, the at least one preference indication comprises said at least one active signal and at least one deny signal indicative of whether a request to enter the quiescent state is denied.

9. The data processing apparatus according to claim 8, wherein the controller is configured to trigger a quiescent state entry process for transitioning each of said plurality of devices from the normal state to the quiescent state when said at least one active signal from each of the plurality of devices indicates that none of the devices has activity to perform.

10. The data processing apparatus according to claim 8, wherein the controller is configured to suspend a quiescent state entry process for transitioning each of said plurality of devices from the normal state to the quiescent state when the at least one active signal from one of the devices of said first type indicates that the device has activity to perform, or when the at least one deny signal from one of the devices of said second type indicates that said request to enter the quiescent state is denied.

11. The data processing apparatus according to claim 8, wherein the controller is configured to trigger the quiescent state exit process for transitioning each of said plurality of devices from the quiescent state to the normal state when the at least one active signal from one of the plurality of devices indicates that there is activity to perform.

12. The data processing apparatus according to claim 1, wherein the controller is configured to switch said plurality of devices to the power saving state when all of said plurality of devices are in the quiescent state.

13. The data processing apparatus according to claim 1, comprising a shared power supply configured to supply power to the plurality of devices;
wherein in the power saving state, the plurality of devices are isolated from the shared power supply.

14. The data processing apparatus according to claim 1, comprising a shared clock supply configured to supply a clock signal to the plurality of devices;
wherein in the power saving state, the plurality of devices are isolated from the shared clock supply.

15. The data processing apparatus according to claim 1, comprising at least one further device for which the controller is configured to control transitions between the normal state and the quiescent state independently from said plurality of devices.

16. A controller comprising:
control circuitry configured to control transitions of a plurality of devices between a normal state and a quiescent state in which the device is ready for being placed in a power saving state; and
an interface configured to receive, from each of the plurality of devices, at least one preference indication indicative of a preference for that device to operate in the normal state or the quiescent state;
wherein the control circuitry is configured to control a common state transition process for transitioning each of said plurality of devices between the normal state and the quiescent state, in dependence on the at least one preference indication received from each of the plurality of devices; and
said common state transition process comprises one of:
a quiescent state entry process for transitioning each of said plurality of devices from the normal state to the quiescent state; and
a quiescent state exit process for transitioning each of said plurality of devices from the quiescent state to the normal state;
wherein the control circuitry is configured to trigger the quiescent state exit process for transitioning each of said plurality of devices from quiescent state to the normal state when a preference indication from any one of said plurality of devices indicates preference to operate in the normal state.

17. A method for controlling a plurality of devices having a normal state and a quiescent state in which the device is ready for being placed in a power saving state; the method comprising:
  receiving from each of the plurality of devices at least one preference indication indicative of a preference for that device to operate in the normal state or the quiescent state; and
  controlling a common state transition process for transitioning each of said plurality of devices between the normal state and the quiescent state, in dependence on the at least one preference indication received from each of the plurality of devices;
  wherein said common state transition process comprises one of:
    a quiescent state entry process for transitioning each of said plurality of devices from the normal state to the quiescent state; and
    a quiescent state exit process for transitioning each of said plurality of devices from the quiescent state to the normal state; and
  the method comprises triggering the quiescent state exit process for transitioning each of said plurality of devices from the quiescent state to the normal state when a preference indication from any one of said plurality of devices indicates a preference to operate in the normal state.

18. The data processing apparatus according to claim 1, wherein the controller is configured to control said transitions to provide that, other than during the quiescent state entry process or the quiescent state exit process, each of said plurality of devices is in the same one of the normal state and the quiescent state.

* * * * *